Patented Aug. 13, 1946

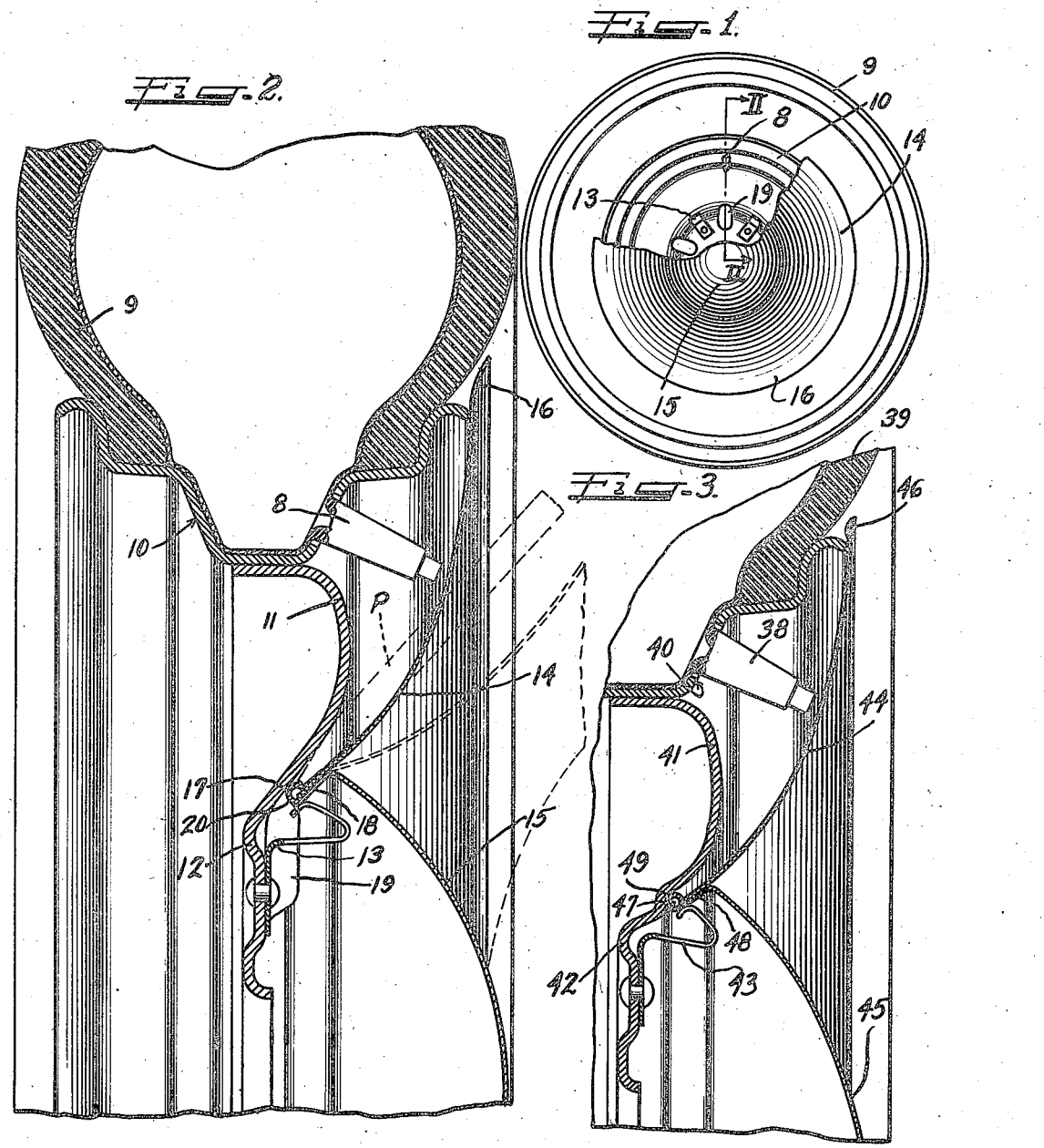

2,405,586

UNITED STATES PATENT OFFICE 2,405,586

WHEEL STRUCTURE

George Albert Lyon, Allenhurst, N. J.

Application October 14, 1943, Serial No. 506,175

7 Claims. (Cl. 301—37)

This invention relates to a wheel structure, and more particularly to the provision in a wheel structure of means for spacing a rear side of a cover from the wheel whereby a pry-off tool may be inserted in said space from the rear side of the cover.

An object of this invention is to provide an improved wheel cover structure which may be easily applied to a wheel in a detachable manner and which is so formed as to seat and center itself on the wheel in such a manner that the cover structure may be more easily pried off from the wheel with less likelihood of the pry-off tool denting or damaging the cover structure.

Another object of this invention is to provide a novel multi-part cover structure including an annular plastic ring and a centrally arranged telescoping hub cap which are so formed at their junction that they are spaced at the junction from the wheel body when a turned edge on one of the cover parts is seated on the wheel body, whereby the space may be utilized in the prying off of the cover structure from the wheel.

A still further object of the invention is to provide a multi-part cover structure including an outer annular plastic flexible ring and a central telescoping hub cap with means at the junction of these parts comprising a novel engagement of the wheel body by the cover parts at said junction, which engagement facilitates the centering of the cover on the wheel and also provides for the easy ejection of the cover structure from the wheel.

In accordance with the general features of this invention, there is provided in a wheel structure including tire rim and body members, an annular flexible plastic cover for disposition over the rim and body members in a position to telescopingly receive a hub cap disposed over the center of the wheel for clamping the inner edge of the cover to the wheel, the wheel body member having means for detachably retaining the hub cap and the cover on the wheel, the inner margin of the cover being formed on an incline and being spaced from the wheel body to provide for the introduction in such space of a pry-off tool inserted from the rear side of the cover, the cover also being flexible away from the wheel to permit of the insertion of the tool in such space, and said inclined margin of the cover being clampingly engaged by an inclined marginal skirt of the cap whereby said skirt backs up the inclined portion of the cover and whereby the same pry-off force is effective to eject both the cap and the cover from the wheel.

Still another feature of the invention relates to the forming in the aforesaid structure of shoulder means on the wheel body member defining a seat for accommodating an inner turned edge of the cover in such a manner that such turned edge spaces the cover from the body member to provide the space for receiving the pry-off tool.

Yet another feature of the invention relates to the provision in the foregoing wheel structure of shoulder means on the wheel body member either in the form of spaced protuberances or an annular ledge which not only serves to facilitate the centering of the cover and hub cap on the wheel, but also serves to cooperate in spacing of the cover from the wheel body for the purpose previously noted.

Other objects and features of this invention will more fully appear from the following detail description taken in connection with the accompanying drawing which illustrates several embodiments thereof, and in which Figure 1 is a side view of a wheel structure embracing the features of this invention and showing the cover and hub cap parts partly broken away in order to illustrate the spring clip and shoulder means on the wheel body member;

Figure 2 is an enlarged fragmentary cross-sectional view taken on the line II—II of Figure 1 looking in the direction indicated by the arrows and showing clearly the manner in which my novel multi-part structure cooperates at their junction with the specially formed wheel body member, and also showing in dotted lines how a pry-off tool functions in the removal of the cover; and Figure 3 is a fragmentary cross-sectional view similar to Figure 2 illustrating a modification of the invention wherein the shoulder means on the wheel instead of being in the form of spaced protuberances is in the form of an annular ledge or shoulder.

As shown on the drawing:

The reference character 10 designates generally a conventional drop-center, multi-flange type of tire rim in which is seated a conventional pneumatic tube tire 9. The tire assembly is provided with the usual valve stem 8 which projects through an opening in one of the flanges of the tire rim 10.

The tire rim 10 is carried on a load bearing or body member 11, sometimes termed a spider, and which may be formed in any suitable manner, such, for example, by a stamping operation. The body member 11 is of a dished or shell-like construction and includes a centrally depressed section 12 which is adapted to be secured in the usual way by means of bolts (not shown) to a support on an axle and which bolts must be accessible for the purpose of detaching the wheel from the axle when it becomes necessary to change a tire, or the like.

Suitably attached, as by means of rivets, to the depressed central section 12 of the wheel body 11 are a plurality of spring clips 13 which are illustrated as being of the inverted type and are now well-known in the art. These spring clips are of such a configuration as to enable a wheel cover structure to be easily applied to the wheel and yet which so hold the wheel cover on the wheel as to make it more difficult to remove the same by a pry-off tool. It is, of course, understood that a wheel cover must be removable in order to enable access to the wheel attaching bolts.

The wheel cover structure, as illustrated in Figures 1 and 2, comprises an outer annular part or ring 14 and a central circular part or hub cap 15. The outer ring is made of a resiliently flexible material which is self-sustaining as to form such, for example, as synthetic plastic. For illustration, I have attained excellent results by making such a ring out of ethyl cellulose. As distinguished therefrom, however, the center part 15, while it may, if so desired, be made of plastic, is preferably made out of metallic sheet, or, in other words, constitutes a metallic stamping.

The outer peripheral portion of the outer ring or cover part 14 is curved into an outwardly turned lip 16, which lip portion may abut the outer edge of the tire rim 10, but is preferably spaced from the wall of the tire as shown so as not to dig into the tire as the tire flexes in use.

The inner peripheral portion of the ring 14 is turned rearwardly and is adapted to be retained on the hub cap 15 by means of a turned bead 17 on the hub cap. This bead 17, as shown in Figure 2, is turned over and envelops the inner edge of the ring 14. It should also be noted that the bead is the most rearwardly disposed portion of the two-part cover and is adapted to contact and be seated on the inclined surfaces 20 of a plurality of spaced bumps 19 formed on or attached to the circular portion 12 of the wheel body 11. This bead constitutes a means for spacing the cover from the adjoining inclined portion of the wheel body or the spider so that a pry-off tool P, shown in dotted lines, may be inserted in this space after the outer portion of the ring 14 is flexed away from the wheel to the dotted line position shown in Figure 2.

The hub cap 15 has an inclined rear skirt 18 which extends in the same general direction as the inner edge of the ring 14 so as to permit of said inner edge portion of the ring to seat flushly thereon. Thus the skirt 18 constitutes a reenforcing backing for the inner edge of the plastic ring 14.

In Figure 2, I have illustrated the cover in its retained position and have shown one of the spring clips 13 and one of the bumps 19 therein. It is to be understood that any suitable number of these elements may be employed, although I usually employ 3 to 5 of each arranged in a common circle, as shown in Figure 1.

When the cover structure is in the retained position shown in Figure 2, it is held in contact with the wheel at two locales, namely at the outer edge of the tire rim 10 adjacent the tire and at the bumps 19. Thus the plastic ring 14 may be held in stressed and tight engagement with both the rim and body members of the wheel.

Moreover, the cover member 14 cannot be pulled off of the hub cap since it is locked to the hub cap skirt 18 on the rear of the hub cap. In this retained position, the inclined free extremities of the spring clips 13 cam the cover structure through the skirt 18 and bead 17 tightly against the wheel body 11. These spring clips, as noted before, are of a well known construction and permit of what is usually called an easy-on, hard-off action.

Whenever it is desired to obtain access to the valve stem 8, such objective can be accomplished by manually flexing the outer portion of the plastic ring away from the wheel to an extent sufficient to permit of the application of the air hose nozzle to the outer extremity of the valve stem 8. By a similar flexing action, a pry-off tool P may be inserted behind the flexed outer portion of the ring and into a space between the cover ring and the wheel body 11 directly over the bead 17, whereby the pry-off force can be applied directly to the zone of retention and to an area of the plastic ring that is reenforced by the backing afforded by the hub cap skirt 18. Removal is easily effected in this manner by a simple twisting of a pry-off tool, which may be in the form of a screw driver or the like.

Another advantage of this cover structure and wheel arrangement resides in the fact that the inclined portion of the wheel body 11 adjacent the bumps 19 serves as a guide in progressively centering the cover as it is pushed axially home into retained engagement with the cam-like extremities of the clips 13.

It should further be noted that in the act of removing or applying the cover structure, the plastic ring 14 serves to protect the metallic cap 15 from denting should the operator drop the structure.

It is, of course, to be understood that, if so desired, the valve stem may be longer than the one shown in Figure 2, in which event it would have to extend through a hole in the cover plate 14.

Also it should be noted that the bumps 19 may be integral or may be suitably attached as by means of welding or riveting to the wheel body.

In Figure 3, I have illustrated a modification of the invention which is quite similar in operation to the form shown in Figures 1 and 2. In this form of the invention, the tire 39 is mounted on a tire rim 40 attached to the wheel body 41. The tire, or rather the tube thereof, is provided with the valve stem 38. The body 41 has a central portion or flange 42 by which the wheel may be secured to a suitable support by conventional wheel bolts (not shown). The wheel body member 41 is of a dished configuration or, in other words, it is of a shell-like formation. It has, adjacent the central section 42, an annular shoulder 49 on which the cover structure of my invention is adapted to be seated and centered. Attached to the central section 42 of the wheel body are a plurality of spring clips 43, which are similar in structure and function to the clips 13.

Cooperable with the wheel is a two-part cover comprising a plastic outer ring 44 and a central hub cap 45, which parts correspond in character and material to the parts 14 and 15 of the first form. The outer edge of the plastic ring 44 is provided with a slight lip 46 which is not as great as the lip 16, but which functions in the same manner as the lip 16.

In this form of the invention the two cover parts 44 and 45, instead of being locked together by a bead and held together by the inner edge of the plastic ring 44, have the outer ring elastically stretched from the rear side of the cap 45 over and onto the inclined rear skirt 46 of the hub cap. This skirt terminates in a beaded edge 47 over which the inner edge of the ring 44 must be elastically stretched or snapped in order for it to be retained between the skirt 46 and its bead 47.

The shoulder 49 performs the same function as the bumps 19 and the bead 47 when seated thereon, as shown, serves to space the rear inner margin of the cover ring 44 from the adjoining inclined portion of the wheel body 41. This space is adapted to receive the blunt end of a pry-off tool, such as the tool P in Figure 2, in the same manner as in the case of the first form of the invention. Inasmuch as this form of the invention operates and functions in the same manner as the previously described one, a recitation of the same is not thought to be necessary.

In conclusion, it might be noted that the turned free extremities of the spring clips 13 and 43 serve to tightly wedge the bead edge 17—47 of the cover structure against the inclined outer surface of the wheel body as well as serve to stiffen the cover at the point of application of the pry-off force.

An advantage of both of the structures described above is that the construction of the wheel spider admits of the inner restrained edge of the cover structure to extend axially inwardly to a point adjacent the median plane of the tire whereby the ensuing curve of the outer ring is caused to closely follow the curve of the side wall of the tire. This in effect causes the outer ring to appear to be a continuation of the side wall of the tire, and when this ring is given a proper finish, such, for example, as a light color, it appears to constitute a white wall of the tire. If the ring 14—44 is finished with a white color, the tire will appear to have a white side wall and will appear to extend clear down to the central hub cap 15—45.

I claim as my invention:

1. In a wheel structure including tire rim and body members, an annular plastic cover for disposition over the rim and body members, a hub cap disposed over the center of the wheel for clamping the inner edge of the cover to the wheel and having an inclined margin, and means for detachably retaining the hub cap on the wheel, the inner margin of said cover being formed on an incline and spaced from the wheel body to provide a space for the insertion of a pry-off tool therein, said cover being flexible away from the wheel to permit of the insertion of the tool in said space and said inclined margin of the cover being clampingly engaged by the inclined margin of the cap whereby said inclined cap margin backs up said inclined cover margin and whereby the same pry-off force is effective to eject both the cap and the cover from the wheel.

2. In a wheel structure including tire rim and body members, an annular plastic cover for disposition over the rim and body members, a hub cap disposed over the center of the wheel for clamping the inner edge of the cover to the wheel, and means for detachably retaining the hub cap on the wheel, the inner margin of said cover being formed on an incline and spaced from the wheel body to provide a space for the insertion of a pry-off tool therein, said cover being flexible away from the wheel to permit of the insertion of the tool in said space and said inclined margin of the cover being clampingly engaged by an inclined marginal skirt of the cap whereby said skirt backs up said inclined portion and whereby the same pry-off force is effective to effect both the cap and the cover from the wheel, the margin of said hub cap being formed with a bead engaging the wheel body member and spacing both the cover and the margin of the cap from the wheel body whereby said pry-off tool space is provided.

3. In a wheel structure, a wheel body member having centrally disposed outwardly projecting shoulder means and a multi-part wheel cover cooperable with said shoulder means at the junction of the parts, one of the parts comprising an outer flexible plastic annular cover and the other comprising a centrally arranged hub cap having rearwardly disposed skirt means terminating in a turned edge for engaging said shoulder means and spacing the cover from the wheel body member and for engaging the inner margin of the cover part, and retaining means on the wheel body member detachably cooperable with the junction of said parts for clamping the hub cap against the annular cover part and for clamping said turned edge against the shoulder means on the wheel body.

4. In a wheel structure, a wheel body member having centrally disposed outwardly projecting shoulder means and a multi-part wheel cover cooperable with said shoulder means at the junction of the parts, one of the parts comprising an outer flexible plastic annular cover and the other comprising a centrally arranged hub cap having rearwardly disposed skirt means terminating in a turned edge for engaging said shoulder means and spacing the cover from the wheel body member and for engaging the inner margin of the cover part, and retaining means on the wheel body member detachably cooperable with the junction of said parts for clamping the hub cap against the annular cover part and for clamping said turned edge against the shoulder means on the wheel body, said turned edge of said cover part cooperating with the shoulder means on the wheel to define an inclined space to the rear of the cover part and which is accessible for the introduction of a pry-off tool therein upon the flexing of an outer margin of the cover part bodily away from the wheel.

5. In a wheel structure including tire rim and body members, an annular plastic cover for disposition over the rim and body members, a hub cap disposed over the center of the wheel for clamping the inner edge of the cover to the wheel, and means for detachably retaining the hub cap on the wheel, the margin of said hub cap being formed with a turned edge engaging shoulder means on the wheel body member to provide a space within which a pry-off tool may be inserted from the rear side of said plastic cover after the flexing of said cover, said shoulder means comprising a plurality of circularly arranged spaced bumps on the wheel, each of which cooperates to define an annular seat for said turned edge.

6. In a wheel structure including tire rim and body members, an annular plastic cover for disposition over the rim and body members, a hub cap disposed over the center of the wheel for clamping the inner edge of the cover to the wheel, and means for detachably retaining the hub cap on the wheel, the margin of said hub cap being formed with a turned edge engaging shoulder means on the wheel body member to provide a space within which a pry-off tool may be inserted from the rear side of said plastic cover after the flexing of said cover, said shoulder means comprising a depressed annular seat in the body member on which said turned edge is seated.

7. In a wheel structure including tire rim and body members, a multi-part cover for disposition over the rim and body members including a hub cap part and an outer, annular, plastic part, said hub cap part being disposed over the center of the wheel for clamping the inner edge of the annular cover part to the wheel, and means for detachably retaining the hub cap part on the wheel, one of the adjoining margins of one of said cover parts being formed with a rearwardly turned edge engaging shoulder means on the wheel body member to provide a space between said cover part and wheel within which a pry-off tool may be inserted from the rear side of the plastic cover part after the flexing of said cover part.

GEORGE ALBERT LYON.